United States Patent [19]
Rodrigue

[11] 3,772,864
[45] Nov. 20, 1973

[54] SUGAR CANE TOPPING CUTTER AND SELECTIVE CUT TOP DIRECTOR

[75] Inventor: Kenneth Rodrigue, Thibodaux, La.

[73] Assignee: Cane Machinery & Engineering Company, Inc., Thibodaux, La.

[22] Filed: Mar. 5, 1973

[21] Appl. No.: 338,275

Related U.S. Application Data

[63] Continuation of Ser. No. 247,163, April 24, 1972, abandoned.

[52] U.S. Cl. .................... 56/63, 56/10.7, 56/503
[51] Int. Cl. ........................................ A01d 45/02
[58] Field of Search ................... 56/10.7, 63, 503

[56] References Cited
UNITED STATES PATENTS
3,596,447  8/1971  Makeham .................... 56/10.7

FOREIGN PATENTS OR APPLICATIONS
405,003  4/1966  Australia .................... 56/63
409,961  10/1966  Australia .................... 56/63

Primary Examiner—Antonio F. Guida
Attorney—Robert A. Theibault

[57] ABSTRACT

The present disclosure is directed to a device for topping sugar cane stalks while harvesting same which provides a flat walled structure which rotates with the topping cutter to provide a flat positive knocking surface to engage the cut top and knock it to either the right or left side of the harvester. The topper drive is reversible so that cut cane tops may be knocked to either the left or right side of the harvester.

5 Claims, 5 Drawing Figures

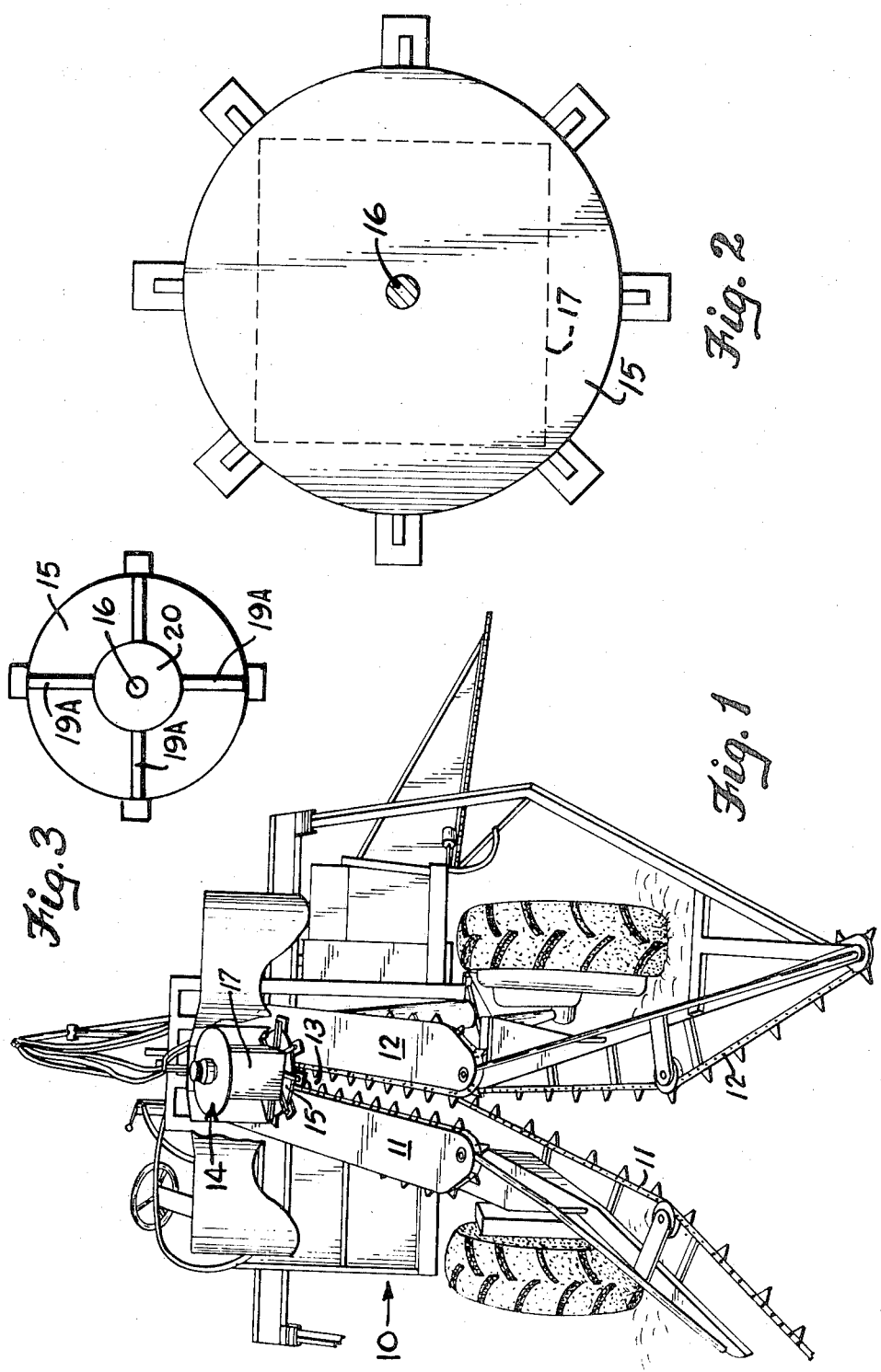

SUGAR CANE TOPPING CUTTER AND SELECTIVE CUT TOP DIRECTOR

This application is a continuation of application Ser. No. 247,163, filed Apr. 24, 1972 now abandoned, for A SUGAR CANE TOPPING CUTTER AND SELECTIVE CUT TOP DIRECTOR.

An object of the present invention is the provision of an improved topping cutter for a sugar cane harvester of the type genrally shown in U.S. Pat. No. 3,561,197 granted Feb. 9, 1971 in which a topping cutter is provided with a flat walled plural faced structure which upstands from and rotates with the topping cutter and which will engage the severed tops and selectively knock the tops to either side of the harvester.

A further object of the present invention is the provision of a reversibly driven topper which cooperates with a flat walled structure in the form of a regular N-sided polygon of box like configuration to control the positive directional throw of cut cane tops to either side of the harvester.

With the foregoing and other objects in view the invention will be more fully described hereinafter and more particularly pointed out in the appended claims.

In the drawings in which like parts are denoted by reference characters throughout the several views:

FIG. 1 is a front elevational view of a sugar cane harvester equipped with the improved topper of the present invention.

FIG. 2 is a top plan view of the topper circular cutting disk shown in the N-sided flat walled regular polygon structure for knocking away cut cane tops.

FIG. 3 is a top plan view of a modified form of flat walled structure upstanding from the circular cutting disc for knocking away cut cane tops to either side of the harvester.

Referring now to FIG. 1, 10 designates generally a Louisiana-type sugar cane harvester having front end cane gathering chains 11 and 12 which direct the sugar cane to an erect position and guide it to the harvester throat 13 where at the top is located the reversible cane topper 14 of the present invention.

Figure 5:
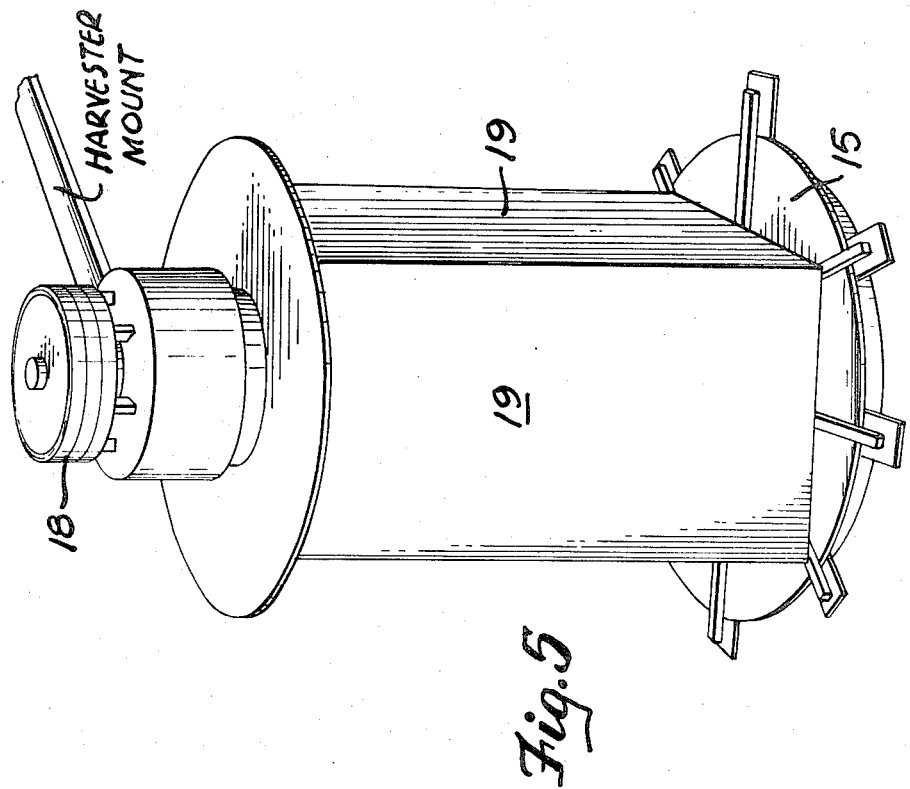
FIG. 5 is a perspective view of the embodiment of FIGS. 1 and 4.
Figure 4:
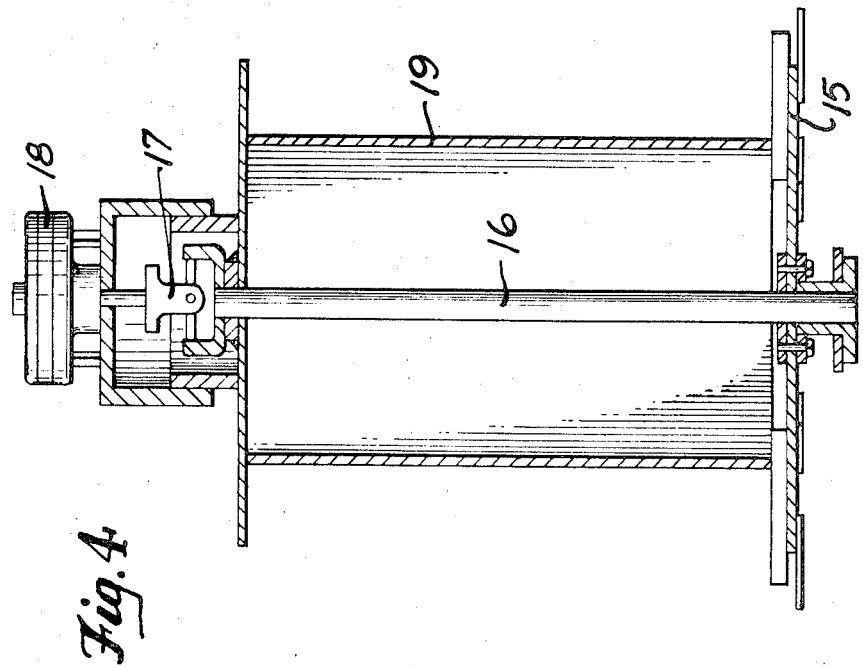
FIG. 4 is a vertical section taken through the improved topper structure shown in FIG. 1 showing its drive connection.

The topper 14, as best seen in FIGS. 2 and 4 has a circular cutting disc 15 secured to rotate with a drive shaft 16, driven through a universal 17 by a reversible hydraulic motor 18. Outwardly of the shaft 16 is a flat walled structure 19 in the form of a square box like structure having a plurality of flat walls for engaging the cut cane tops and knocking or directing them selectively to either side of the harvester. In the embodiment illustrated in FIGS. 2, 4 and 5 the flat walled N-sided polygonal structure is shown as a square box structure in cross section; however, any regular N-sided polygon having flat walls will work such as a pentagon or hexigon.

A modified form of the flat walled structure is shown in FIG. 3 in which a plurality of flat walled blades 19A extend radially from a hub 20 secured to shaft 16 for rotation therewith. The vertical height of the blades 19A would be the same as the flat walls of the sides of the box like structure 19 shown in FIG. 5.

The reversible hydraulic motor 18 is under the control of a reversibly actuatable valve in the harvesters hydraulic system (not shown) and is located at the harvester operator control console.

When it is desired to direct the cut cane tops away from a field of standing cane, depending upon the direction of travel of the harvester the operator will cause the topper to rotate in the direction away from the standing cane so that the flat walls of the box-like structure 19 or the blades 19A in the embodiment of FIG. 3 will engage the severed cut cane tops and direct them in the desired direction of deposit.

What I claim:

1. For use with a sugar cane harvester having a prime mover and drive system for actuating rotary cane earth severing cutters and toppers, a sugar cane topping cutter and selective cut top director comprising:
   a. a substantially flat rotary circular cutter;
   b. a single vertical flat walled box-like structure upstanding from said circular cutter and secured thereto; and
   c. reversible drive means adapted to be connected to the drive system and to selectively drive said cutter and flat walled box-like structure clockwise and counter clockwise for knocking cut tops to either the right or left side of the harvester away from the harvester side adjacent the rows of cane to be cut.

2. A sugar cane topping cutter as claimed in claim 1 wherein said closed vertically flat walled structure is a regular box-type N-sided polygon.

3. A sugar cane topping cutter as claimed in claim 1 wherein said reversible drive means is a reversible hydraulic motor connected to rotatably drive said cutter and flat walled structure.

4. A sugar cane harvester comprising, a mobile frame having a prime mover and drive system for actuating a rotary cane earth severing cutter and topper, gathering chains extending forwardly and disposed in spaced forwardly divergent relationship to the topper, said sugar cane topper comprising a substantially flat rotary circular cutter, a single vertical walled closed structure upstanding from said circular cutter and secured thereto, the axis of rotation of said single vertical flat walled closed structure being substantially vertical and disposed between the spaced gathering chains and reversible drive means connected to said drive system to selectively drive said cutter and substantially flat walled closed structure clockwise and counterclockwise for knocking cut tops to either the right or left side of the harvester away from the harvester side adjacent the rows of cane to be cut.

5. A sugar cane harvester as claimed in claim 4 wherein said single vertical walled closed structure is a multiplicity of corners joined together by walls therebetween to define said closed wall structure.

* * * * *